Aug. 27, 1946.  A. A. STUDLER  2,406,515
ANGLE INDICATOR AND CHECKING INSTRUMENT
Filed Oct. 20, 1942  2 Sheets-Sheet 1
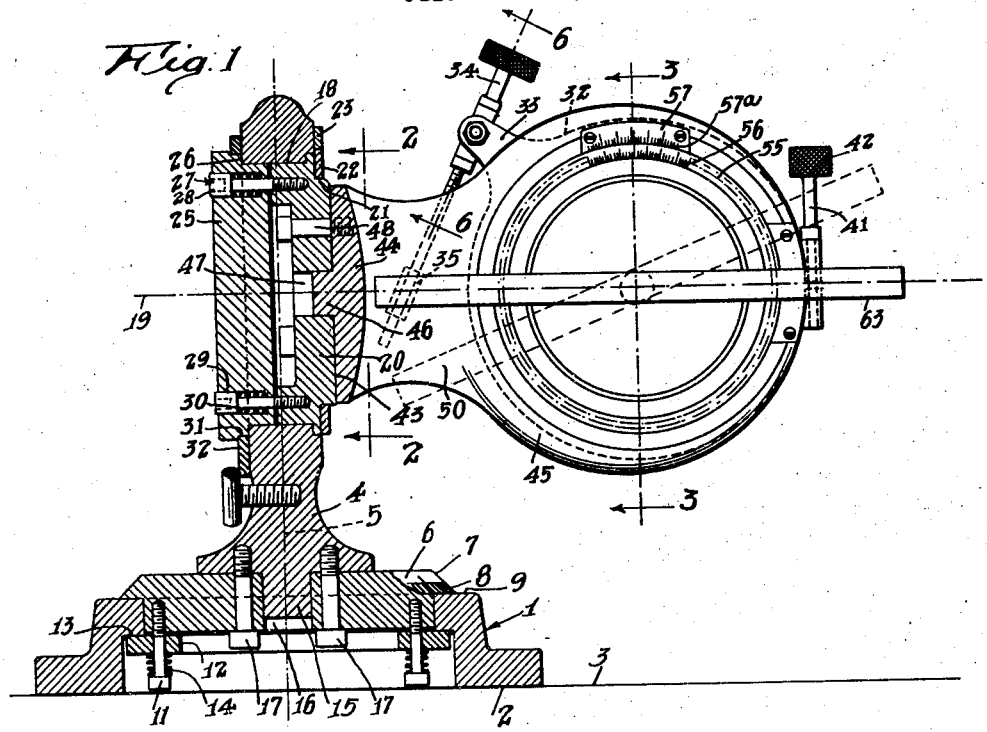
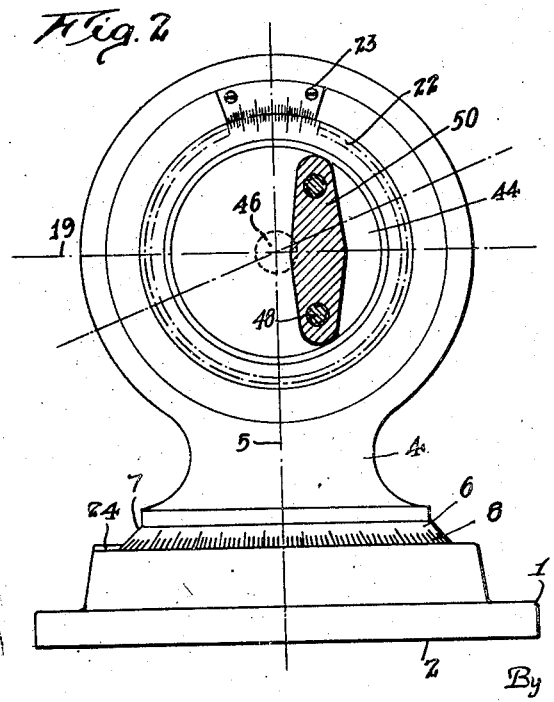
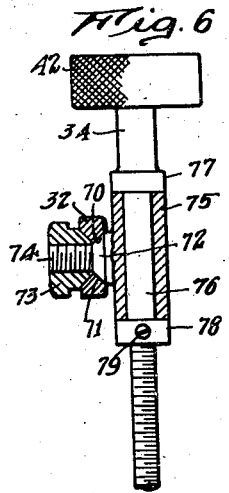
Inventor
Aurele A. Studler
By Lyon & Lyon
Attorneys Aug. 27, 1946.  A. A. STUDLER  2,406,515
ANGLE INDICATOR AND CHECKING INSTRUMENT
Filed Oct. 20, 1942  2 Sheets-Sheet 2
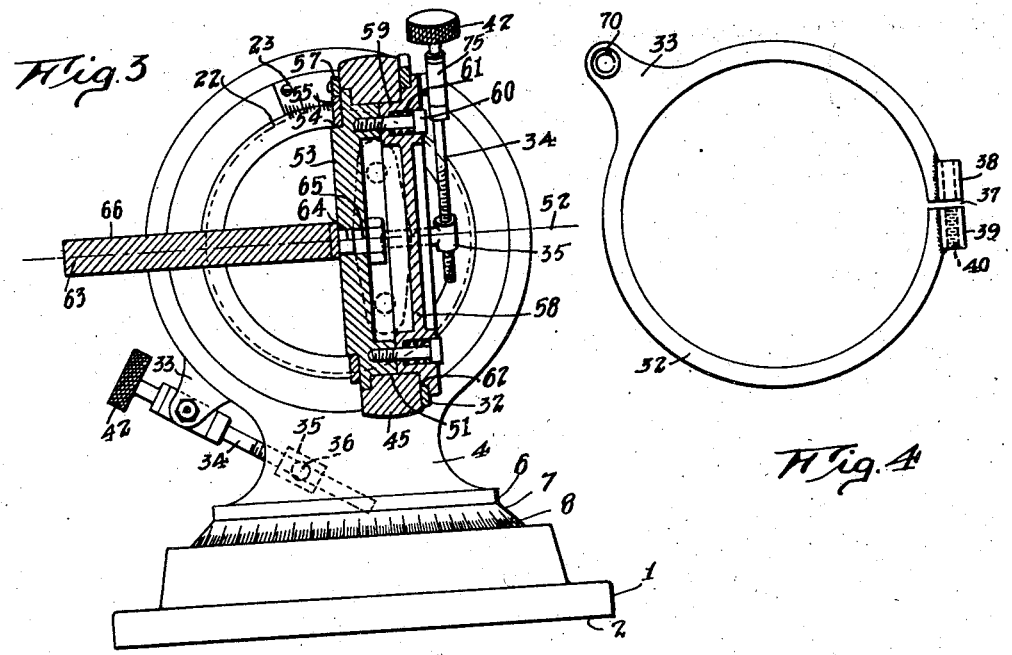
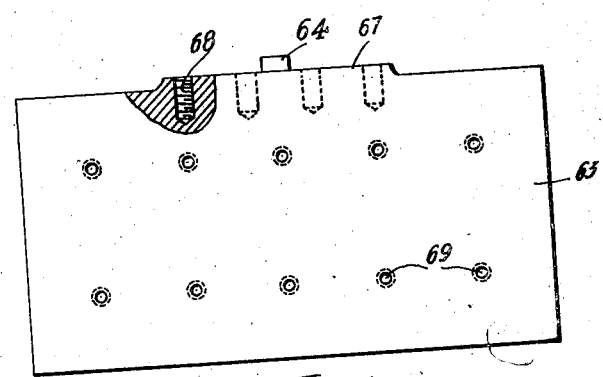
Inventor
Aurele A. Studler
By Lyon & Lyon
Attorneys Patented Aug. 27, 1946

2,406,515

UNITED STATES PATENT OFFICE 2,406,515

ANGLE INDICATOR AND CHECKING INSTRUMENT

Aurele A. Studler, Los Angeles, Calif.

Application October 20, 1942, Serial No. 462,689

7 Claims. (Cl. 33—174)

This invention relates to an instrument for measuring angles and for enabling the dimensions and angles on a machine part to be accurately indicated.

One of the objects of the invention is to provide an instrument of this character which can be used for checking a machine part before the same is machined, to ascertain whether the part is properly formed and capable of being properly machined to produce the finished machine part.

A further object of the invention is to provide an instrument of this kind which is capable of use for checking a finished machine part to ascertain whether it is correct in all its dimensions and angles of parts; also enabling any angular parts or extensions on a machine piece to be accurately measured as to such angular extension.

A further object of the invention is to provide an instrument of this kind which is so constructed that it can be employed to support a machine part so that the machine part is movable about three different axes, and in such a way that all of the dimensions and angles that must be measured on the machine part can be measured without disengaging the machine part; in other words, so as to enable the machine part or casting to be completely checked in one operation.

Further objects of the invention will appear hereinafter.

The invention consists in novel parts and combinations of parts to be described hereinafter, all of which contribute to producing an efficient angle indicator and checking instrument.

A preferred embodiment of the invention is described in the following specification, while the broad scope of the invention is pointed out in the appended claims.

In the drawings:

Figure 1 is a vertical section taken through the base and body portion of the instrument.

Figure 2 is a vertical section taken on the line 2—2 of Figure 1 and further illustrating details of the upper portion of the body of the instrument, and associated with a horizontal axis of rotation which is, of course, disposed at right angles to the vertical axis of rotation in the plane of the section illustrated in Figure 1.

Figure 3 is a vertical section taken about on the line 3—3 of Figure 1, and this section passes through a portion of the instrument which provides for rotation of the supported part on a third axis, which is at right angles to the second axis.

Figure 4 is a side elevation of an adjustable clamping ring, two of which are provided to provide a mounting for hand adjustment for the dials of the instrument in measuring angles.

Figure 5 is a plan, partially broken away, illustrating a platen or plate of the machine on which the machine parts, such as a casting, is secured when it is necessary to measure it or check its dimensions, and angles of any angularly disposed extensions.

Figure 6 is a section taken on the line 6—6 of Figure 1 indicating the manner in which the adjusting screw is mounted on the ring illustrated in Figure 4.

Referring more particularly to the parts, 1 indicates the base of the instrument, which has a true surface 2 that operates as a seat face for the base. In use, this base would rest upon a true surface 3, such as a platen or face plate.

On this base 1 a frame is supported including a housing 4 rotatably mounted on a vertical axis 5, and this housing seats on an angle indicating head 6, the side face 7 of which is preferably of conical form and provided with graduations forming a scale 8. The graduations of this scale cooperate with the zero point or base point on the upper face 9 of the base 1.

The body of the head 6 is of cylindrical form and seats in a bore in which it fits accurately. This head is retained in position by means of a plurality of bolts 11 that are screwed up into the head from below. These bolts pass through a follower ring 12, which is pressed upwardly against an annular shoulder 13 of the base 1 by coil springs 14 associated with the individual bolts. As illustrated, there are four of these bolts, but in practice there may be fewer or more of these bolts.

The housing 4 is seated on the head 6 in a similar manner; that is to say, on the axis 5 it is provided with an integral pintle 15 that is received in a bore 16. This pintle and bore accurately center the housing on the axis 5, and this housing is secured in place by bolts 17 that pass up from below into the housing, as indicated.

The upper portion of the housing 4 is of substantially circular form, as illustrated in Figure 2, and it is provided with a bore 18 of large diameter that is formed about a horizontal axis 19, which axis is disposed at right angles to the vertical axis 5. In this bore a head 20 is rotatably mounted, and this head is provided with a seat including a shoulder 21 for a graduated scale 22 in the form of a ring. The graduations on this scale cooperate with a zero point on a short plate 23 secured to the base of the housing in such a way as to enable its vernier scale to cooperate with the graduations on the scale 22. A similar vernier scale 24 is provided on the base 1 to cooperate with the scale 8, already referred to (see Figure 2).

The head 20 is held in place in the bore 18 through the agency of a backing plate 25, which also fits into the bore 18 and is provided with a shoulder 26 to seat against the rear face of the housing 4. A plurality of Allen screws or bolts 27 are provided that pass into this back plate from the rear side, and these screws are threaded into the inner face of the head 20. These screws 27 have heads 28 that fit nicely into bores 29 to receive them, and these bores operate as spring chambers to receive coil springs 30, respectively, that thrust against the bottom of the spring sockets at their inner ends and thrust against the inner faces of the heads 28 at their outer ends.

The outer side of the backing plate 25 is provided with an annular groove 31, which is a seat for an adjustable ring 32, which is shown in said elevation in Figure 4. This ring has a short arm 33 (see Figure 3) that extends down at an angle of approximately 45°, and this arm affords means for mounting the swivel end of an adjusting screw 34, the threads of which pass through a threaded sleeve 35, indicated in dotted lines in Figure 3 and also indicated in Figure 1. This sleeve 35 is formed like a T-head on a threaded shank 36 that is screwed into the back of the housing 4 and which is loose in the thread so as to enable the sleeve to swing on the axis of this threaded shank in rotating the head 20 to orient it on its axis 19, to indicate the angle of orientation. The ring 32 is split, as at 37 (see Figure 4), and at this point lugs 38 and 39 are provided integral with the ring. One of these lugs, for example lug 39, is threaded as at 40 to receive a clamping bolt, similar to the clamping bolt 41 illustrated in Figure 1. This clamping bolt enables this ring 32 to be secured tightly to the backing plate 25. With this construction, it will be evident that by rotating the milled head 42 of the adjusting screw 41 the indicating head 20 can be rotated in either direction desired.

The indicating head 20 is provided with a seat 43 for the foot 44 of a second housing 45, and this housing 45 extends off in a horizontal direction, as indicated in Figure 1. The foot 44 is provided with a centering pintle 46 that is received nicely in a centering bore 47, and this foot is secured on its seat by means of a plurality of bolts 48 that are threaded into the housing 45, as illustrated in Figure 1. The body of the housing 45 is of substantially cylindrical form, like the housing 4, with a neck 50 connecting the same to its foot 44. The construction and parts associated with the housing 45 are substantially the same as the parts associated with the housing 4 and its indicating head 20. These parts are clearly illustrated in Figure 3. The housing 45 is formed with a bore 51 on a third horizontal axis of rotation 52, and in this bore on its inner side an indicator head 53 is mounted, which is similar to the indicator head 20 and which functions in a similar manner. On the forward face of the head 53 a seat 54 is formed for a scale ring 55 carrying graduations forming a scale 56 (see Figure 1), and at the upper edge of this scale a plate 57 is attached to the face of the housing carrying a vernier 57a.

As in the case of the indicator head 20, the indicator head 53 is held in place by a backing plate 58 that has a neck 59 received in the bore 51, and Allen screws 60 are provided, the heads of which are located in spring sockets 61 and the threaded ends of which are received in the inner face of the indicator head 53. This backing plate 58 has a rabbet groove 62 that is a seat for one of the rings 32. In this connection, the arm 33 of this ring extends upwardly at an angle of about 45° and affords means for mounting an adjusting screw 34 constructed the same as the first-named adjusting screw 34 that is associated with the indicator head 20. This ring 32 is also split and provided with a clamping screw 41, as illustrated in Figure 1. The lower end of the adjusting screw 34 passes into a sleeve 35 constructed like the first-named sleeve 35, and the threaded shank of this sleeve 35 is screwed into the rear end of the neck 50.

The forward face of the head 53 carries a platen or clamping plate 63. This platen is centered in the head of an integral cylinder 64 that fits nicely in a bore 65 passing into the head from the front of the plate. This bore 65 is, of course, formed about the axis 52 on which the indicating head 53 rotates. The upper face 66 of the platen is an absolutely true surface, and when the indicator head 53 is in its zero position this face 66 will be horizontal. This platen is supported so that its face lies in a plane parallel to the third axis of orientation 52, and preferably is disposed so that it extends in a plane substantially radial with respect to that axis, as indicated in Fig. 1.

The middle portion of the platen 63 is offset to form a boss 67 that is secured to the forward face of the indicator head 53 by bolts that pass through the head 53 from its rear side, being received in threaded sockets 68 in the boss 67.

Referring again to Figure 2, it will be observed that the neck 50 is offset from the vertical axis 5. This is done for a purpose; that is to say, in order to provide a line or a face associated with the plate that will lie on the horizontal axis 19. In the present instance, the forward face of the indicator head 53 lies on this axis 19, and this enables an operator of the instrument to measure distances from this face across the plate 63.

The upper face of the plate 63 is provided with a plurality of openings 69, which are preferably in the form of threaded sockets, in which clamping-down bolts can be applied for holding the piece of work on the upper face of this plate.

It will be evident that this instrument provides for supporting the machine part or "work" on the platen 63 in such a way that the work can be oriented about three axes—namely, the vertical axis 5, the horizontal axis 19, and the horizontal axis 52. This enables any angles or compound angles to be indicated by the machine where it is necessary to measure such angles on a piece of work. As the distance from the true surface 3 to the axis 19 is a predetermined known dimension, it will be evident that, if desired, all vertical measurements of a part on the platen can be made from this surface as a base line. All horizontal dimensions can be measured, and also any angles by orienting the parts of the instrument about the three axes described. This enables a complete check-up of all dimensions and angles to be made on the machine part attached to the platen substantially in one operation and without necessitating the parts being detached or secured in any new position.

In Figure 6, I illustrate a detail of the mounting for the adjusting screws 34. In this connection, it will be noted that each arm 33 of the ring 32 is provided with two conical counterbores 70. In one of these counterbores a conical shoulder 71 formed on a pintle 72 seats, and on the other side the clamping nut 73 screws up onto the threaded pin 74 of this pintle. The pintle 72 is formed integral with the sleeve 75, in which a long journal 76 on the adjusting screw rotates. Adjacent the milled head 42 of each adjusting screw an integral collar 77 is formed which seats on one end of the sleeve 75 while the collar 78 secured to the adjusting screw seats upon the other end of the sleeve. This collar 78 may be secured on the adjusting screw by means of a small set-screw 79.

What I claim is:

1. In apparatus for marking or checking the dimensions and measuring angles on a machine part or the like, the combination of a base, said base having a housing extending upwardly therefrom, with a circular bore therein on a horizontal axis, a rotary head, mounted in said bore, capable of rotation continuously in one direction on said axis through 360° and having an indexed scale thereon, said rotary head having a housing extending therefrom with a circular bore therethrough on a second axis extending perpendicular to the first named axis, a second rotary head mounted on the last named bore and capable of rotating on said second axis continuously in one direction through 360°, and having an indexed scale thereon; and a holder plate rigid with said last named rotary head having a true plane face disposed in a plane substantially radial to said third axis, and having means for securing the machine part on said true plane face.

2. Apparatus according to claim 1 including means associated with the second and first rotary heads respectively for gradually adjusting the same on their respective axes of rotation.

3. Apparatus according to claim 1 including a clamping ring mounted on said second rotary head, and a clamping ring mounted on said third rotary head, said clamping rings having means for tightening and loosening the same on their corresponding heads, and operating when loose to permit their heads to be swung freely on their axes of rotation; and means connected with each of said clamping rings for gradually rotating the rotary heads when their clamping rings are tight on the same.

4. In apparatus for marking, or checking the dimensions and measuring angles on a machine part, or the like, the combination of a frame, a holder for the machine part supported on said frame, said holder having a plate with a true plane face capable of lying in a horizontal plane, said plate having means for facilitating clamping the said machine part on said true plane face, hand-actuated threaded means for effecting gradual adjusting orientation of said plate on a first horizontal axis and for indicating the degree of said orientation; and hand actuated threaded means for effecting gradual adjusting orientation of said plate on a second axis, said second axis being capable of assuming a position in the same horizontal plane as said first named axis, with hand-actuated threaded means for indicating degrees of any orientation about said second axis; said second axis being substantially coincident with the plane of said plate; and means for enabling an indicated degree of orientation of said plate about a third, vertical, axis to be effected.

5. Apparatus for marking or checking the dimensions and measuring angles on a machine part or the like according to claim 1 in which the said housing of the first named rotary head is offset from its said axis of rotation, and in which the inner, supported, edge of the holder plate is substantially in line with that axis.

6. In apparatus for marking a machine part or checking its dimensions and measuring angles thereon, the combination of an upright supporting housing having a circular bore therein on a horizontal axis, a rotary head mounted in said circular bore and capable of rotation therein through 360°, with an indexed scale associated therewith for indicating the degree of rotation of said rotary head, said rotary head having a housing extending in a general horizontal direction from said first named housing and offset from said horizontal axis, said second named housing having a circular bore therethrough on a horizontal axis, a second rotary head mounted in said last named bore for rotation through 360°, with an indexed scale for indicating its orientation on said second named axis, and a holder plate fixed to said last named rotary head extending in a radial plane with respect to said second named axis, said holder plate having a true plane face with means for securing a machine part thereon; said holder plate being capable of assuming a horizontal position in which its said true plane face is horizontal; and hand-actuated threaded means associated with the first named rotary head for effecting gradual adjustments thereof for orienting the same; and hand-actuated threaded means for effecting gradual adjustments of said second rotary head for orienting the same on the axis of its supporting bore.

7. In apparatus for marking a machine part and checking its dimensions or measuring angles thereon, the combination of a base platen having a true plane, upper surface, a frame supported on said base platen, a holder for the machine part, means for mounting the holder on the frame for rotation about a first horizontal axis, and about a second axis extending at right angles to the first named axis and intersecting the same, said holder having a face-plate with a true plane face lying in a plane substantially radial with respect to said second axis, and capable of assuming a position in which said true plane face of said holder is in a horizontal position parallel with the said true plane surface of the base platen, and capable of assuming a position in which the true plane face of the holder is in a true vertical plane, at right angles to said true plane surface of said base platen; and means for effecting gradual adjusting orientation of said holder on either of said two axes.

AURELE A. STUDLER.